US010542478B2

(12) United States Patent
Tsuchie

(10) Patent No.: US 10,542,478 B2
(45) Date of Patent: Jan. 21, 2020

(54) RADIO COMMUNICATION SYSTEM, RADIO RELAY DEVICE, AND STORAGE MEDIUM

(71) Applicant: Oki Electric Industry Co., Ltd., Tokyo (JP)

(72) Inventor: Kota Tsuchie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/002,050

(22) Filed: Jun. 7, 2018

(65) Prior Publication Data

US 2018/0368048 A1 Dec. 20, 2018

(30) Foreign Application Priority Data

Jun. 20, 2017 (JP) ................................ 2017-120727

(51) Int. Cl.
*H04W 40/22* (2009.01)
*H04W 40/12* (2009.01)
*H04W 40/24* (2009.01)
*H04W 88/04* (2009.01)

(52) U.S. Cl.
CPC .......... *H04W 40/22* (2013.01); *H04W 40/12* (2013.01); *H04W 40/246* (2013.01); *H04W 88/04* (2013.01)

(58) Field of Classification Search
CPC .................................................... H04W 40/22
USPC ........................................................ 370/315
See application file for complete search history.

(56) References Cited

U.S. PATENT DOCUMENTS

| 7,430,181 | B1* | 9/2008 | Hong .................. H04W 12/003 |
| | | | 370/254 |
| 9,986,411 | B1* | 5/2018 | Stamatakis ........... H04W 8/005 |
| 2011/0063999 | A1 | 3/2011 | Erdmann et al. |
| 2013/0322297 | A1* | 12/2013 | Dominguez ............ H04W 4/21 |
| | | | 370/255 |
| 2017/0208636 | A1* | 7/2017 | Agiwal ................... H04W 8/00 |
| 2017/0230484 | A1* | 8/2017 | Lai .......................... H04L 67/42 |
| 2018/0160325 | A1* | 6/2018 | Cheng ................... H04W 76/14 |
| 2018/0220480 | A1* | 8/2018 | Agiwal ................ H04W 24/08 |

FOREIGN PATENT DOCUMENTS

| JP | 2009-302694 A | 12/2009 |
| JP | 2011-523830 A | 8/2011 |

* cited by examiner

*Primary Examiner* — Peter G Solinsky

(74) *Attorney, Agent, or Firm* — Rabin & Berdo, P.C.

(57) ABSTRACT

A radio communication system includes: a radio communication device; and radio relay devices. The radio communication device includes an adjacent node discovery unit configured to transmit an adjacence discovery packet, and a connection destination selection unit configured to receive response packets from radio relay devices, and then select the connection destination on the basis of index values related to communication qualities. The radio relay device includes an adjacent node information management unit configured to manage the index value of a radio relay device adjacent to the radio relay device; a response waiting time calculation unit configured to receive the adjacence discovery packet, and then calculate a response waiting time to transmission of the response packet by using the index values of the radio relay device and the adjacent radio relay device, and a response packet transmission unit configured to transmit the response packet.

9 Claims, 6 Drawing Sheets

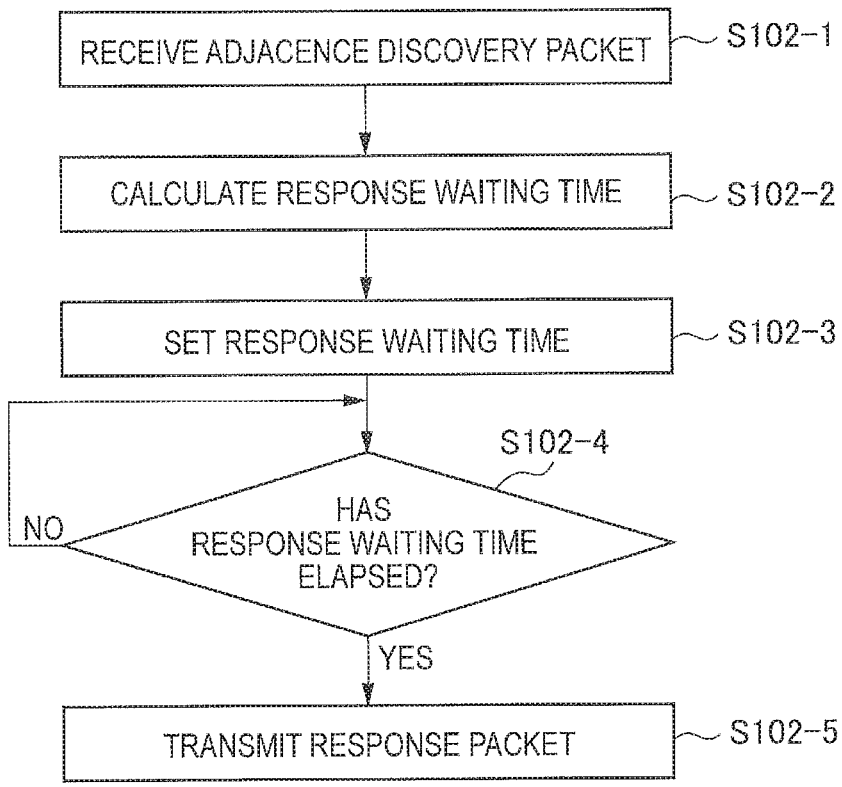

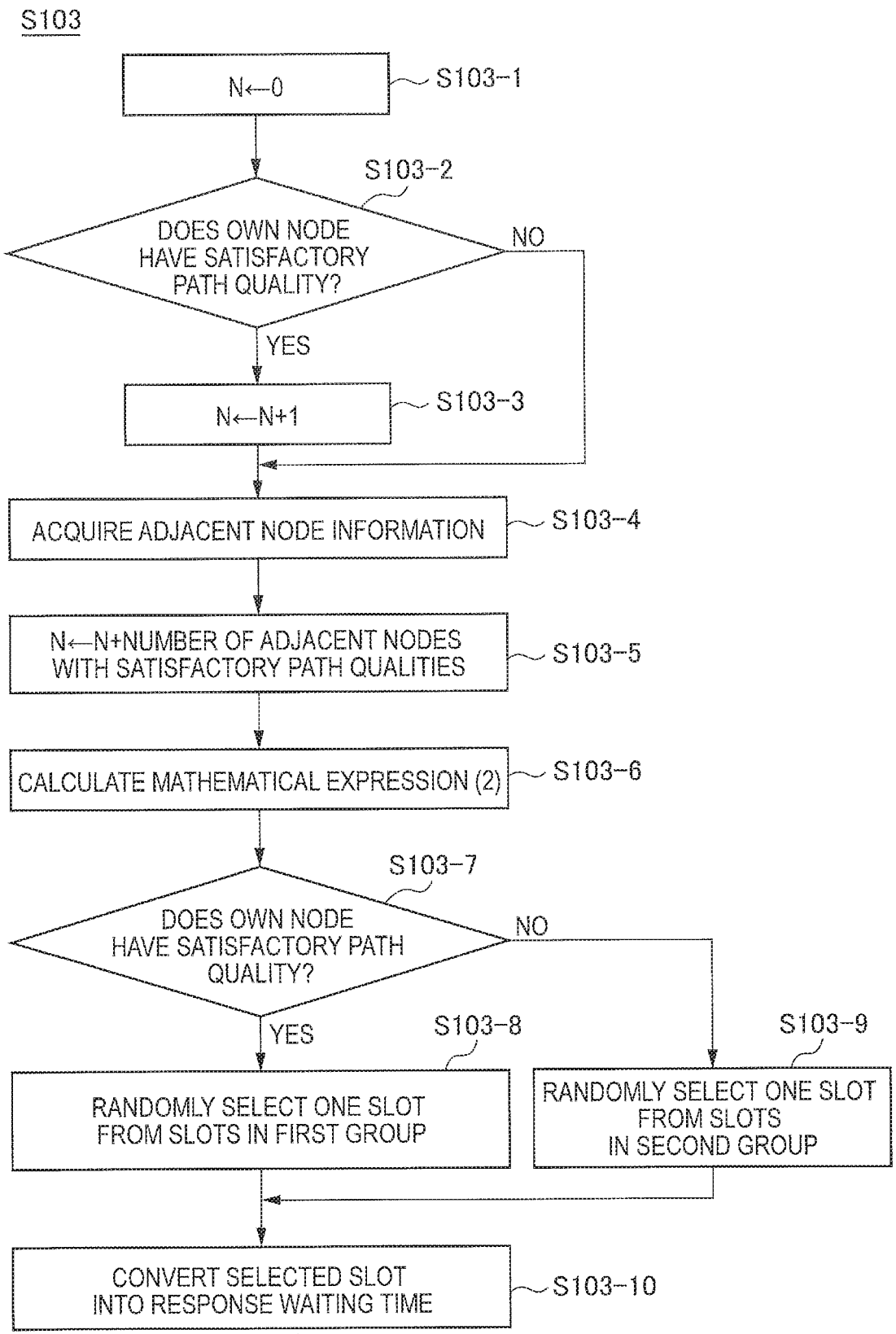

FIG. 7A
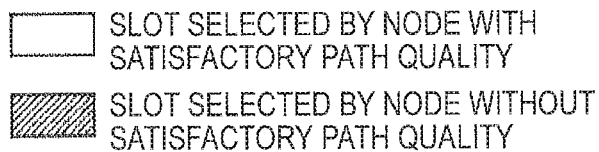
SLOT SELECTED BY NODE WITH SATISFACTORY PATH QUALITY
SLOT SELECTED BY NODE WITHOUT SATISFACTORY PATH QUALITY
CASE WHERE THERE ARE SMALL NUMBER OF ADJACENT NODES WITH SATISFACTORY PATH QUALITIES
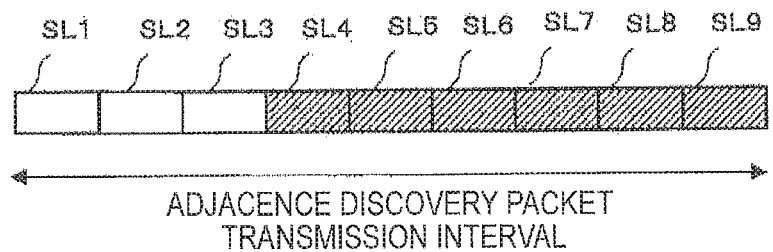
FIG. 7B
CASE WHERE THERE ARE LARGE NUMBER OF ADJACENT NODES WITH SATISFACTORY PATH QUALITIES
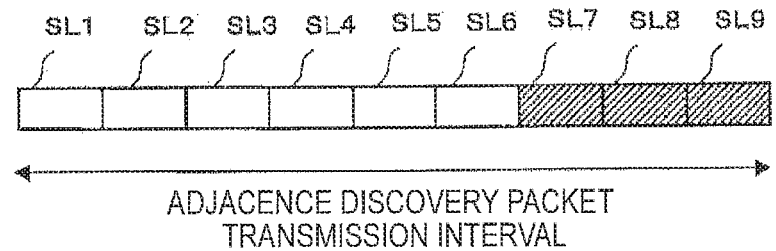
FIG. 8
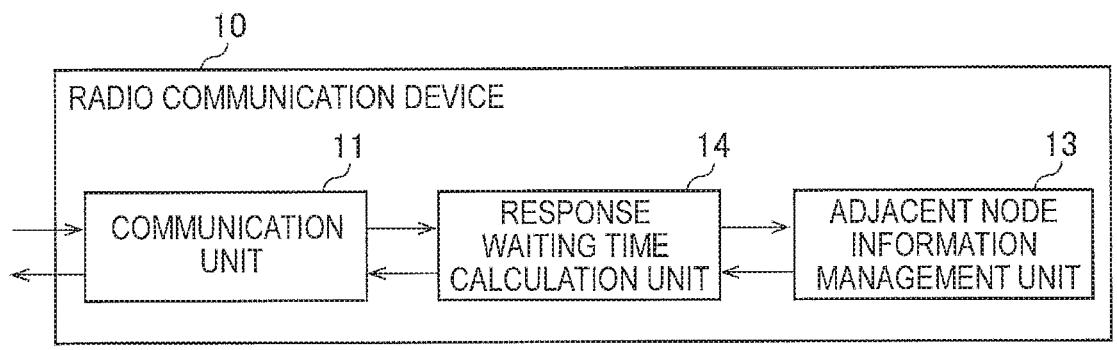

RADIO COMMUNICATION SYSTEM, RADIO RELAY DEVICE, AND STORAGE MEDIUM

CROSS REFERENCE TO RELATED APPLICATION(S)

This application is based upon and claims benefit of priority from Japanese Patent Application No. 2017-120727, filed on Jun. 20, 2017, the entire contents of which are incorporated herein by reference.

BACKGROUND

The present invention relates to a radio communication system, a radio relay device, and a recording medium. For example, the present invention can be applied to a radio multi-hop network.

In the case where each of radio communication devices (hereinafter, also referred to as "nodes") cannot directly communicate with a management device that manages each of the nodes in a radio network system including the plurality of nodes and the management device, the radio network system may adopt a multi-hop network in which instead of a node that cannot perform direct communication, another node relays the communication. Such a multi-hop network enables a node at a long distance to communicate with a management device.

In the case where a node that newly participates in the multi-hop network (hereinafter, also referred to as a "participation node") cannot directly communicate with the management device when the participation node participates in (joins) the network, the participation node selects a node (hereinafter, also referred to as a "parent node") that relays a network participation request packet instead of the participation node, from among nodes that have already joined the network. In order to select such a parent node, the participation node broadcasts a packet (hereinafter, also referred to as an "adjacence node discovery packet) for discovering nodes (hereinafter, also referred to as "adjacent nodes") around the participation node. An adjacent node that has received the packet returns a response packet to the participation node. At this time, if a transmission timing of the response packet from the adjacent node is the same as another adjacent node, packet collision happens, and the participation node cannot receive the response packet. Therefore, to avoid the collision, the adjacent node waits for random time after receiving the adjacent node discovery packet, and then transmits the response packet.

There are various ways to select an optimum parent node. For example, one of the ways is to select a node having the highest received signal strength (RSSI value) of a received packet. The participation node can decide the optimum parent node by collecting response packets from all adjacent nodes and selecting the parent node from among all the adjacence nodes. However, in order to collect the response packets from all the adjacence nodes, the participation node have to consider random waiting time of the response packets and wait for maximum waiting time that may be selected. Here, since a larger number of adjacent nodes results in higher probability of collision of the response packets, it is necessary to limit the collision probability to a certain level or lower. Therefore, the maximum value of random waiting time has to be set to be a little longer in view of the case of a large number of adjacent nodes.

As described above, since the participation node takes a lot of time to select the parent node, time to join the network is unfortunately prolonged.

Technologies described in JP 2009-302694A and JP 2011-523830T are technologies of methods for selecting an optimum parent node in a multi-hop network. According to the technologies described in JP 2009-302694A and JP 2011-523830T, a participation node receives information on an adjacent node (the number of current child nodes, the number of hops to the management device, round-trip time (RTT) to reach the management device, and the like) from the adjacent node, and selects an adjacent node that seems to be optimum as a parent node.

In addition, according to JP 2011-523830T, each node calculates a packet loss rate or signal-to-noise ratio (SN ratio) from a communication history with adjacent nodes, and dynamically changes the optimum parent node in accordance with such information even after participating in the network.

SUMMARY

However, the technologies described in JP 2009-302694A and JP 2011-523830T are technologies related to indicators for selecting an optimum parent node. In order to select the optimum parent node, the technologies are premised on waiting for response packets from all adjacence nodes.

Therefore, the parent node selecting time is heavily dependent on random waiting time to wait for response packets transmitted from the adjacent nodes.

Accordingly, a radio communication system, radio relay device, and storage medium that are capable of effectively deciding a radio relay device serving as a connection destination and promptly participating in a radio network have been desired.

According to a first embodiment of the present invention, a radio communication system includes: a radio communication device configured to request connection to a network; and a plurality of radio relay devices configured to relay the connection request to the network. (1) The radio communication device includes (1-1) an adjacent node discovery unit configured to transmit, to the surrounding network, an adjacence discovery packet for discovering a radio relay device serving as a connection destination among the plurality of radio relay devices, and (1-2) a connection destination selection unit configured to receive one or more response packets from one or more radio relay devices in response to the adjacence discovery packet, and then select the radio relay device serving as the connection destination from among the one or more radio relay device on the basis of index values related to communication qualities used for determining whether to select, as the communication destination, the radio relay devices that are transmission sources of the response packets. (2) The radio relay device includes (2-1) an adjacent node information management unit configured to manage the index value of a radio relay device adjacent to the radio relay device; (2-2) a response waiting time calculation unit configured to receive the adjacence discovery packet from the radio communication device, and then calculates a response waiting time to transmission of the response packet by using the index value of the radio relay device and the index value of the adjacent radio relay device, and (2-3) a response packet transmission unit configured to transmit the response packet to the radio communication device after elapse of the response waiting time calculated by the response waiting time calculation unit.

According to a second embodiment of the present invention, a radio relay device in a radio communication system includes a radio communication device configured to request connection to a network, and a plurality of radio relay devices configured to relay the connection request to the network. The radio relay device includes: (1) an adjacent node information management unit configured to manage an index value related to a communication quality of a radio relay device adjacent to the radio relay device; (2) a response waiting time calculation unit configured to receive, from the radio communication device, an adjacence discovery packet for discovering a radio relay device serving as a connection destination among the plurality of the radio relay devices, and then calculates a response waiting time to transmission of a response packet in response to the adjacence discovery packet by using the index value of the radio relay device and the index value of the adjacent radio relay device; and (3) a response packet transmission unit configured to transmit the response packet to the radio communication device after elapse of the response waiting time calculated by the response waiting time calculation unit.

According to a third embodiment of the present invention, a non-transitory computer-readable storage medium has a radio relay program stored therein, the radio relay program causing a computer installed in a radio relay device in a radio communication system including a radio communication device configured to request connection to a network and a plurality of radio relay devices configured to relay the connection request to the network, to function as: (1) an adjacent node information management unit configured to manage an index value related to a communication quality of a radio relay device adjacent to the radio relay device; (2) a response waiting time calculation unit configured to receive, from the radio communication device, an adjacence discovery packet for discovering a radio relay device serving as a connection destination among the plurality of the radio relay devices, and then calculates a response waiting time to transmission of a response packet in response to the adjacence discovery packet by using the index value of the radio relay device and the index value of the adjacent radio relay device; and (3) a response packet transmission unit configured to transmit the response packet to the radio communication device after elapse of the response waiting time calculated by the response waiting time calculation unit.

According to the present invention, it is possible to effectively decide a radio relay device serving as a connection destination and promptly participate in a radio network.

BRIEF DESCRIPTION OF THE DRAWINGS

FIG. 5 is a flowchart illustrating operation (adjacence discovery packet reception operation) of a radio communication device (parent candidate node) according to the present embodiment;

FIG. 6 is a flowchart illustrating operation (response packet transmission waiting time calculation operation) of a radio communication device (parent candidate node) according to the present embodiment;

FIG. 7A is an explanatory diagram illustrating an adjacence discovery packet transmission interval that is divided into slot units according to the present embodiment;

FIG. 7B is an explanatory diagram illustrating an adjacence discovery packet transmission interval that is divided into slot units according to the present embodiment;

FIG. 8 is a block diagram (part 1) illustrating a functional configuration of a radio communication device according to a modification.

DETAILED DESCRIPTION OF THE EMBODIMENT(S)

Figure 1:
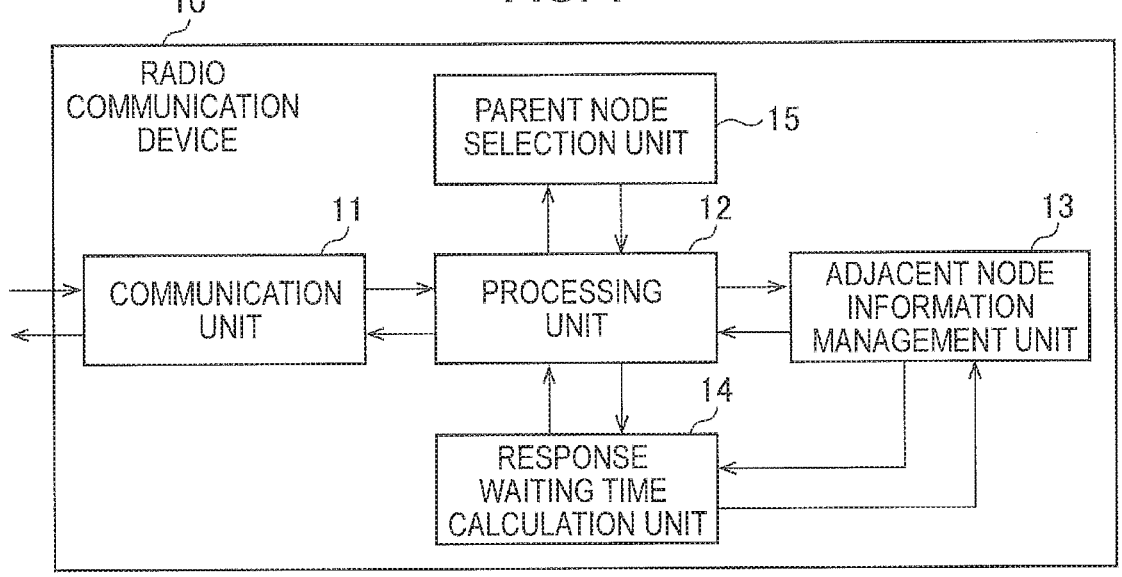
FIG. 1 is a block diagram illustrating a functional configuration of a radio communication device according to the present embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Present Embodiment

Figure 2:
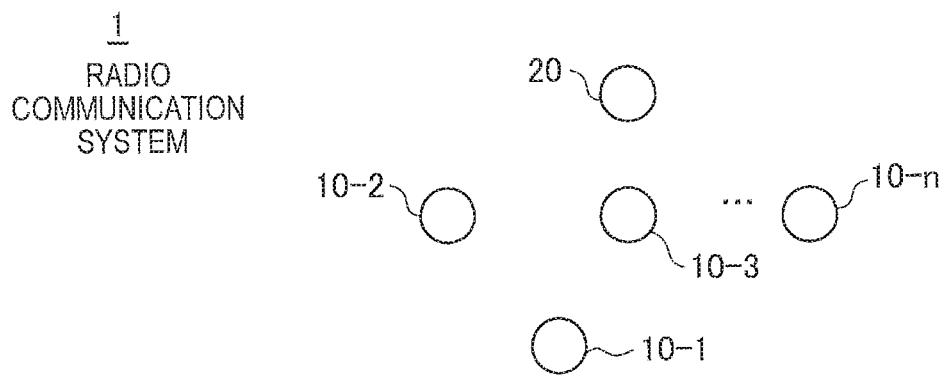
FIG. 2 is a block diagram illustrating an example of an overall configuration of a radio communication system according to the present embodiment.

Hereinafter, with reference to the drawings, a main embodiment of the radio communication system, the radio relay device, and the radio relay program according to the present invention will be described in detail.
(A-1) Configuration According to Present Embodiment
(A-1-1) Overall Configuration FIG. 2 is a block diagram illustrating an overall configuration example of a radio communication system 1 according to the present embodiment.

First, a configuration of the radio communication system 1 will be described.

The radio communication system 1 includes a management device 20 and a plurality of radio communication devices 10 (10-1 to 10-n). The management device 20 manages the radio communication devices 10, and the plurality of radio communication devices 10 perform radio communication. Although the number of devices in the radio communication system 1 is not limited, it is assumed that the radio communication system 1 according to the present embodiment includes one management device 20 and the plurality of radio communication devices 10 (10-1 to 10-n) in this specification.

In addition, in the radio communication system 1, a multi-hop network is established by the management device 20 and nodes including the radio communication devices 10-1 to 10-n. Hereinafter, each of the radio communication devices 10 is referred to as the "node" constituting the multi-hop network. In addition, a node that intends to participate in the network of the radio communication system 1 is referred to as the "participation node", and a node that relays a participation request packet from the participation node to the management device 20 is referred to as a "parent node". In addition, an adjacent node capable of direct communication with a certain node is referred to as an "adjacent node". Communication methods (communication media) between devices (nodes) in the radio communication system 1 are not specifically limited. For example, various wireless LAN interface communication methods can be applied.

Next, features of the radio communication system 1 according to the present embodiment will be described.

According to the present embodiment, an adjacent node (parent candidate node) around a participation node decides a transmission waiting time of a response packet (a response packet to an adjacence discovery packet transmitted by the participation node) by using a path quality and adjacent node information. The "path quality" indicates a communication quality between the own node (radio communication device 10) and the management device 20 (base station). For example, the path quality is represented by a sum of link quality values on a path to the base station (such as values calculated on the basis of RSSI values and packet loss rates). In addition, the "adjacent node information" is information including path qualities and addresses of nodes adjacent to the own node (the information may also include the number of hops to the management device). The adjacent node information is generated from control packets periodically transmitted from the respective nodes, for example.

In the case of a good path quality, a short transmission waiting time is set with regard to a response packet. On the other hand, a long waiting time is set in the case of a bad path quality. However, in the case where the transmission waiting time is set as described above, collision of response packets may occur if there are a large number of adjacent nodes having good path qualities. Therefore, transmission waiting times to be selected by the nodes with good path qualities are decided further by using adjacent node information. Specifically, to avoid collision of response packets, a selectable range of transmission waiting time is set to be wider as the number of adjacent node having good path qualities increases.

In the case where a path quality obtained by adding a path quality of a transmission source node (parent candidate node) of a response packet and a link quality between the participation node and the transmission source node is more than or equal to a threshold, the participation node selects the transmission source node as a parent node.

(A-1-2). Detailed Configuration of Radio Communication Device

Next, an internal configuration of the radio communication device 10 will be described.

FIG. 1 is a block diagram illustrating a functional configuration of the radio communication device. In FIG. 1, the radio communication device 10 includes a communication unit 11, a processing unit 12, an adjacent node information management unit 13, a response waiting time calculation unit 14, and a parent node selection unit 15.

For example, the radio communication device 10 may be constructed by installing programs into a computer including a processor and memory. The program may be stored in a non-transitory storage medium in the radio communication device 10. In addition, a part or all of the radio communication device 10 may be constructed by using hardware (for example, dedicated semiconductor chip, electrical circuit, or the like).

The configuration example according to present embodiment illustrates the radio communication device 10 having functions as a participation node and functions as a parent candidate node (radio relay device). However, the present disclosure is not limited thereto. For example, the parent node selection unit 15 may be omitted in the case where the radio communication device 10 functions only as the radio relay device.

The communication unit 11 is a communication interface for accessing the multi-hop network. For example, the communication unit 11 includes a means for transmitting a packet to the management device 20 or another radio communication device 10 when receiving a packet transmission request from the processing unit 12 (to be described later). Alternatively, in the case where the communication unit 11 cannot directly transmit the packet to the communications partner, the communication unit 11 transmits the packet via another radio communication device 10. Note that, the communication unit 11 can adopt various routing methods as a relay method to another radio communication device 10. For example, the communication unit 11 can adopt routing methods such as Ad hoc On-Demand Distance Vector (AODV) Routing or IPv6 Routing Protocol for Low-Power and Lossy Networks (RPL), as the routing methods. In addition, the communication unit 11 includes a means for measuring an RSSI value when receiving a packet.

Before participating in a network, the processing unit 12 periodically generates a packet (hereinafter, also referred to as an "adjacence discovery packet") for discovering an adjacent radio communication device 10 serving as a parent node candidate, and requests the communication unit 11 to transmit the adjacence discovery packet. When the processing unit 12 receives a response packet from the communication unit 11 in response to the adjacence discovery packet, the processing unit 12 requests the parent node selection unit 15 to make a determination with regard to parent selection. When the processing unit 12 receives an address of a parent node selected by the parent node selection unit 15, the processing unit 12 generates a participation request packet addressed to the management device 20 via the parent node serving as a relay destination, and requests the communication unit 11 to transmit the packet.

On the other hand, when the processing unit 12 receives an adjacence discovery packet from the communication unit 11 after participating in a network, the processing unit 12 acquires a response waiting time from the response waiting time calculation unit 14. Next, after waiting for the acquired waiting time, the processing unit 12 generates a response packet and requests the communication unit 11 to transmit the response packet. Note that, the response packet includes an index value to be referred to when selecting a parent node (in the present embodiment, a path quality value of the own node and an RSSI value at the time of receiving the adjacence discovery packet). In addition, when the processing unit 12 receives a control packet from the communication unit 11, the processing unit 12 requests the adjacent node information management unit 13 to register adjacent node information.

The parent node selection unit 15 includes a means for selecting a radio communication device 10 serving as a parent node on the basis of the received response packets. When the parent node selection unit 15 receives a parent selection determination request from the processing unit 12, the parent node selection unit 15 determines whether to select a transmission source node of the response packet as a parent. In the case where the parent selection is failed as a result of the determination, the parent node selection unit 15 saves information regarding the response packet. However, in the case where the parent selection has been failed until transmission of a next adjacence discovery packet, the parent node selection unit 15 selects a transmission source node as the parent on the basis of the saved information regarding response packets. When the parent node is selected, the parent node selection unit notifies the processing unit 12 of the selected parent node.

The adjacent node information management unit 13 includes a means for storing and managing adjacent node information. When the adjacent node information management unit 13 receives an adjacent node information registration request from the processing unit 12, the adjacent node information management unit 13 extracts the transmission source addresses and information regarding path qualities from the packets, and stores them in a table for managing the addresses of the adjacent nodes and the path qualities in association with each other, for example. In the case of a control packet from a registered node, the adjacent node information management unit 13 updates the path quality in the table. In addition, the adjacent node information management unit 13 considers a node from which the control packet has not been received within a predetermined period of time, as a node that has left the network. Such a node may be deleted from the table.

The response waiting time calculation unit 14 includes a means for calculating a waiting time for transmission of a response packet in response to an adjacence discovery packet of a participation node. When the response waiting time calculation unit 14 receives a response waiting time calculation request from the processing unit 12, the response waiting time calculation unit 14 acquires adjacent node information from the adjacent node information management unit 13 and calculates a response waiting time. The response waiting time calculation unit 14 notifies the processing unit 12 of the calculated waiting time.

(A-1-3). Detailed Configuration of Management Device

Next, an internal configuration of the management device 20 will be described.

Figure 3:
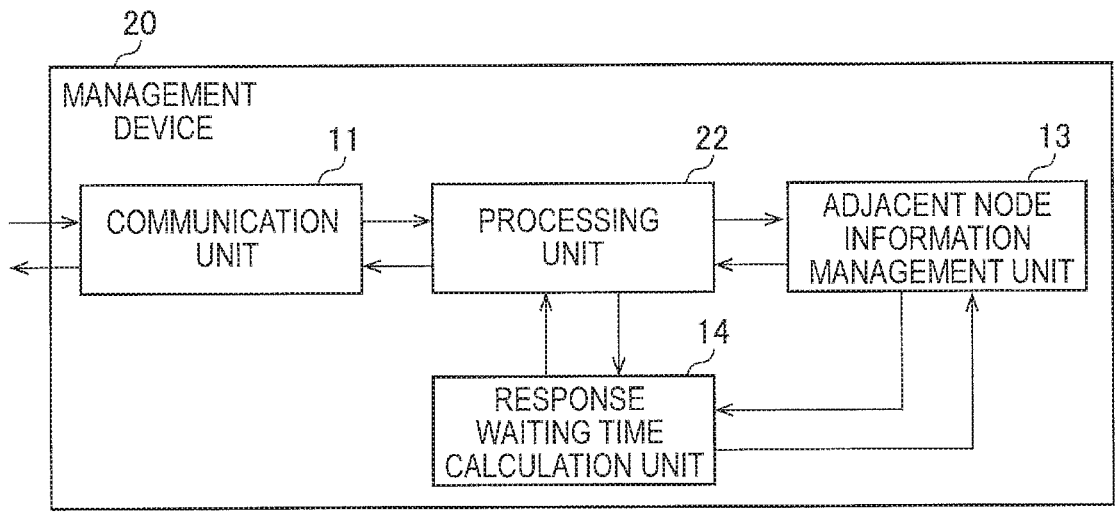
FIG. 3 is a block diagram illustrating a functional configuration of a management device according to the present embodiment.

FIG. 3 is a block diagram illustrating a functional configuration of the management device. The management device 20 has structural elements similar to (the structural elements other than the parent node selection unit 15 of) the radio communication device 10 illustrated in FIG. 1 described above. However, the processing unit of the management device 10 is different from the radio communication device 20. This difference will be mainly described below.

In addition to the functions of the processing unit 12 in the radio communication device 10, the processing unit 22 in the management device 20 includes a means for receiving a participation request packet of a participation node from the communication unit 11, then generating a response packet (participation acceptance packet) in response to the participation request packet, and requesting the communication unit 11 to transmit the packet.

(A-2) Operations According to Present Embodiment

Next, operations of the radio communication system 1 having the above described structural elements according to the present embodiment will be described.

Hereinafter, with reference to FIG. 4 to FIG. 6, operations of respective devices from when a new radio communication device 10 (participation node) selects a node serving as a parent (parent node) from among adjacent nodes (candidate nodes for the parent node of a node that has already joined the network) to when the new radio communication device 10 (participation node) participates in the multi-hop network will be described. Operation of the participation node are described in Steps S101 in FIG. 4 (to be described later). In addition, operation of the adjacent node (parent candidate node) is described in Steps S102 in FIG. 5 and Steps S103 in FIG. 6 (to be described later). In addition, operation of the management device 20 is described in Step S104. Note that, hereinafter, the participation node may be any of radio communication devices 10 (10-1 to 10-n) that have not joined the network of the radio communication system 1 yet. In addition, the adjacent node (parent candidate node) may be any of radio communication devices 10 (10-1 to 10-n) that have already joined the network of the radio communication system 1 in an area in which the devices can receive packets broadcast by the participation node.

[Step S101: Operation of Participation Node]

Figure 4:
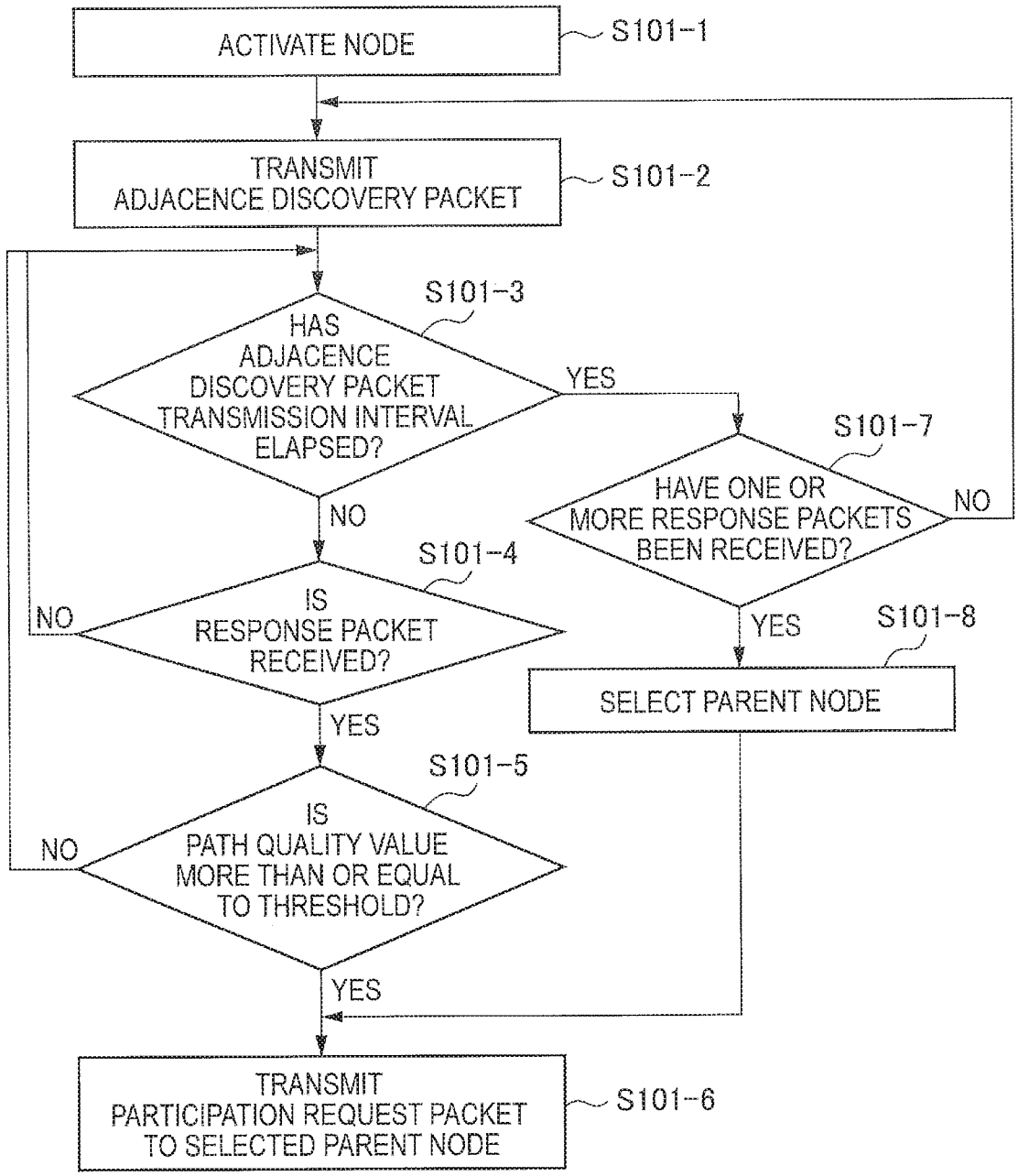
FIG. 4 is a flowchart illustrating operation (network participation operation) of a radio communication device (participation node) according to the present embodiment.

FIG. 4 is a flowchart illustrating operation (network participation operation) of a radio communication device (participation node) according to the present embodiment.

After activation, the participation node (processing unit 12) broadcasts a generated adjacence discovery packet via the communication unit 11 (S101-1 and S101-2) to discover an adjacent node (parent candidate node). At this time, the processing unit 12 sets a timer for measuring time until transmission of a next adjacence discovery packet (hereinafter, referred to as an "adjacence discovery packet transmission interval").

The processing unit 12 conducts processes after Step S101-4 (to be described later) until elapse of the adjacence discovery packet transmission interval (notification of expiration of the set timer). When the adjacence discovery packet transmission interval expires, the processing unit 12 conducts a process in Step S101-7 (to be described later).

When the processing unit 12 receives a response packet from any of adjacent nodes via the communication unit 11, the processing unit 12 notifies the parent node selection unit 15 of an RSSI value at a time of receiving the response packet and information regarding the received response packet (including at least information regarding a path quality value of the response packet and an RSSI value at a time of receiving the adjacence discovery packet) (S101-4).

When the parent node selection unit 15 receives the notification of response packet reception, the parent node selection unit 15 first calculates a link quality value between the own node and the transmission source node (adjacent node) from an RSSI value at the time of receiving the adjacence discovery packet and an RSSI value at the time of receiving the response packet, in order to make a determination with regard to parent node selection. For example, the link quality value is a value obtained by converting two RSSI values into link quality values and multiplying them. The RSSI values are converted into the link quality values by giving one link quality value to a range of the RSSI values. For example, in the case where the RSSI value is −60 dBm or more, the best (largest) value is given as the link quality value. In the case where the RSSI value is less than −60 dBm and more than or equal to −80 dBm, the second largest value is given as the link quality value. In the other cases, the worst (smallest) value is given as the link quality value. Next, the parent node selection unit 15 adds the obtained link quality value and the path quality value of the response packet, and calculates a path quality value from the own node (participation node) to the management device 20.

Next, the parent node selection unit 15 compares the calculated path quality value with a preset threshold (S101-5). In the case where the path quality value is more than or equal to the threshold, the parent node selection unit 15 selects the transmission source node as the parent node. In the case where the path quality value is less than the threshold, the parent node selection unit 15 saves information regarding the response packet therein (the information will be used in Step S101-8 to be described later). In the case where the parent node selection is successful, the parent node selection unit 15 notifies the processing unit 12 of the address of the selected parent node.

When the processing unit 12 receives the notification of the parent node address from the parent node selection unit 15 through the above-described process in Step S101-5 (or a process in Step S101-8 to be described later), the processing unit 12 generates a participation request packet using the address as a relay destination, and transmits the packet via the communication unit (S101-6).

On the other hand, in the case where the notification of the parent node address is not received from the parent node selection unit 15 within the adjacence discovery packet transmission interval, the processing unit 12 notifies the parent node selection unit 15 of a parent node selection request.

When the parent node selection unit 15 receives the parent node selection request from the processing unit 12, the parent node selection unit 15 checks whether one or more response packets have been received before (in other words, whether information regarding one or more response packets is saved therein) (Step S101-7). In the case where no response packet has been received before, the parent node selection unit 15 notifies the processing unit 12 of re-transmission of the adjacence discovery packet (executes the series of processes from Step S101-2 again).

In the case where the one or more response packets have been received as a result of the process in Step S101-7 described above, the parent node selection unit 15 selects a transmission source node of a response packet with the best path quality value as the parent node, and notifies the processing unit 12 of the address of the node selected as the parent node (Step S101-8). The process after the notification will be omitted because the process is similar to the process in Step S101-6 described above.

Next, when the communication unit 11 receives a participation acceptance packet in response to the participation request packet transmitted through the process in Step S101-6, the communication unit 11 notifies the processing unit 12 of the reception. After the notification, the processing unit 12 shifts from the operation as the participation node to operation as a parent candidate node.

[Step S102: Operation of Parent Candidate Node]

FIG. 5 is a flowchart illustrating operation (adjacence discovery packet reception operation) of a radio communication device (parent candidate node) according to the present embodiment.

When the communication unit 11 of the parent candidate node receives an adjacence discovery packet, the communication unit 11 notifies the processing unit 12 of information regarding the adjacence discovery packet (Step S102-1). The processing unit 12 notifies of an RSSI value at the time of receiving the adjacence discovery packet, and requests the response waiting time calculation unit 14 to calculate a response waiting time.

The response waiting time calculation unit 14 executes processes in Steps S103 (to be described later), and calculates the response waiting time (S102-2). The response waiting time calculation unit 14 notifies the processing unit 12 of a calculated response waiting time.

When the processing unit 12 receives the response waiting time, the processing unit 12 waits for the received response waiting time (S102-3).

Next, the processing unit 12 monitors whether the response waiting time elapses. In the case where the response waiting time has elapsed, the processing unit 12 generates a response packet, and requests the communication unit 11 to transmit the response packet (Step S102-4).

The communication unit 11 transmits the response packet to the participation node (S102-5).

[Step S103: Operation of Parent Candidate Node (Response Waiting Time Calculation Operation)]

FIG. 6 is a flowchart illustrating operation (response packet transmission waiting time calculation operation) of a radio communication device (parent candidate node) according to the present embodiment.

Processes in Steps S103-1 to S103-5 (to be described later) are processes for calculating N (the number of adjacent nodes (including own node) with satisfactory path qualities) to be used in a mathematical expression (2) listed below. N is used in a process in Step S103-6 (calculate mathematical expression (2)) to be described later. Next, a response waiting time is obtained by using the mathematical expression (2) calculated in the processes in Steps S103-7 to S103-10. Next, details of the processes in the respective steps will be described.

The response waiting time calculation unit 14 initializes N (sets N at "0") (Step S103-1).

The response waiting time calculation unit 14 converts the RSSI value at the time of receiving the adjacence discovery packet into a link quality value, adds the obtained link quality value and a path quality value of the own node, and compares the addition result with a threshold (S103-2).

In the case where a result of the process in Step S103-2 described above (comparison result) is more than or equal to the threshold, the response waiting time calculation unit 14 considers the own node as a node with a satisfactory path quality for a participation node, and increments N (Step S103-3). On the other hand, in the case where the comparison result is less than the threshold, the response waiting time calculation unit 14 considers the own node as a node without a satisfactory path quality for the participation node (does not perform any process on N).

The response waiting time calculation unit 14 acquires path quality values of all adjacent nodes from the adjacent node information management unit 13, and calculates the number of adjacent nodes having the values more than or equal to the threshold among the acquired path quality values (S103-4).

The response waiting time calculation unit 14 adds N and the number of adjacent nodes having the values more than or equal to the threshold obtained in the process in Step S103-4 described above (S103-5).

Next, the response waiting time calculation unit 14 calculates a response waiting time on the basis of N that represents the number of adjacent nodes with satisfactory path qualities (including the own node), and information indicating whether the own device has a satisfactory path quality (the determination result in Step S103-2 described above). FIG. 7 are explanatory diagrams illustrating an adjacence discovery packet transmission interval that is divided into slot units according to the present embodiment. As illustrated in FIG. 7, the response waiting time is decided by dividing an adjacence discovery packet transmission interval of a participation node into units of slot SL and selecting any of the slots SLs. Each slot SL has a constant length. Slots SLs in a first group among the slots SLs obtained through the division are selected by nodes with satisfactory path qualities, and slots SLs in a second group are selected by nodes without satisfactory path qualities. For example, FIG. 7A illustrates states of slots SLs in the case where there are a small number of adjacent nodes with satisfactory path qualities. The slot SL1 to slot SL3 are slots (slots in the first group) selected by the nodes with satisfactory path qualities. The slot SL4 to the slot SL9 are slots (slots in the second group) selected by the nodes without satisfactory path qualities. On the other hand, FIG. 7B illustrates states of slots SLs in the case where there are a large number of adjacent nodes with satisfactory path qualities. The slot SL1 to slot SL6 are slots (slots in the first group) selected by the nodes with satisfactory path qualities.

The slot SL7 to the slot SL9 are slots (slots in the second group) selected by the nodes without satisfactory path qualities. For example, a boundary between slots selected by nodes with satisfactory path qualities and slots selected by nodes without satisfactory path qualities among the slots SLs obtained through the division is calculated according to a mathematical expression (1).

[Math. 1]

$$P = \sum_{i=0}^{N-1} \binom{N-1}{i} \cdot \left(1 - \frac{1}{\text{slot}}\right)^{N-1-i} \cdot \left(\frac{1}{\text{slot}}\right)^i \cdot \frac{1}{i+1} \quad (1)$$

In the mathematical expression (1), "slot" represents the number of slots, and "N" represents the number of adjacent nodes with satisfactory the path qualities (including own node) as described above. In the mathematical expression (1), "P" represents probability of transmission of a response packet from a certain node with a satisfactory path quality without collision with response packets from the (N−1) number of other adjacent nodes with satisfactory the path qualities (referred to as response packet transmission success rate) in the case where each of the certain node and the (N−1) number of other adjacent nodes randomly selects one slot from among the slots and transmits a response packet. If a response packet transmission success rate that the network system should have is determined in advance, the boundary between slots is calculated such that the response packet transmission success rate P is satisfied.

In other words, the minimum "slot" value that satisfy the mathematical expression (2) listed blow serves as the boundary between slots in the case where "Pgiven" represents the response packet transmission success rate that should be satisfied.

[Math. 2]

$$P_{given} \geq \sum_{i=0}^{N-1} \binom{N-1}{i} \cdot \left(1 - \frac{1}{\text{slot}}\right)^{N-1-i} \cdot \left(\frac{1}{\text{slot}}\right)^i \cdot \frac{1}{i+1} \quad (2)$$

In the case where the own node is determined as the node with a satisfactory path quality through the process in Step S103-2 described above, the response waiting time calculation unit 14 randomly selects one slot from the slots SLs in the first group positioned before the boundary obtained according to the mathematical expression (2) (Step S103-7 and Step S103-8). On the other hand, in the case where the own node is determined as the node without a satisfactory path quality through the process in Step S103-2 described above, the response waiting time calculation unit 14 randomly selects one slot from the slots SLs in the second group (Step S103-9).

The response waiting time calculation unit 14 converts the selected slot SL into a time unit (the selected slot×1 slot size), and notifies the processing unit 12 (S103-10). For example, in the case where the own node has a good path quality and the slot SL2 is selected from among the slots SLs (SL1 to SL3) in the first group, the response waiting time calculation unit 14 calculates a response waiting time by multiplying "2" by the "1 slot size" (notifies the processing unit 12 of the calculated response waiting time).

[Step S104: Operation of Management Device]

When the communication unit 11 of the management device 20 receives a participation request packet from the radio communication device 10, the communication unit 11 notifies the processing unit 22 of the reception. The processing unit 22 generates a participation acceptance packet and transmits the packet via the communication unit 11.

(A-3) Effect According to Present Embodiment

The following effects can be achieved according to the present embodiment.

The response waiting time calculation unit 14 of the radio communication device 10 (parent candidate node) uses path quality information and adjacent node information and calculates a transmission timing of a response packet in response to an adjacence discovery packet of a participation node. In other words, the transmission timing is set by using the path quality information such that the response packet is immediately returned to a parent candidate node with a good path quality. Therefore, it is possible for the participation node to become a first node that receives the response packet from the parent candidate node with the good path quality.

In addition, it is possible for the parent candidate node to calculate an appropriate transmission timing that does not depend on density of installed nodes or the like by using the adjacent node information and dynamically changing a selection range of the response waiting time in accordance with the number of adjacent nodes with good path qualities. For example, in the case where there are a large number of adjacent nodes with good path qualities, it is possible to widen the selection range of the response waiting time. This enables to avoid collision of response packets and this enables the participation node to receive a response packet from a good parent candidate node with high probability. In addition, it is possible for the participation node to select a parent node with a path quality that is more than or equal to a threshold by using path quality information in received response packets. This enables to reduce time spent on the parent node selection.

In addition, according to the present embodiment, it is possible to improve throughput more by setting transmission timings of response packets in response to adjacence discovery packets in the slot units, in comparison with the case where response timings are set in non-slot units.

(B) Another Embodiment

The present invention is not limited to the above described embodiment. The present invention can be applied to a modification exemplified as follows.

(B-1) In the above-described embodiment, the example of using path qualities as indexes for determining good parent candidate nodes. However, the present invention is not limited thereto. For example, it is also possible for the radio communication device 10 to use a link quality value per hop obtained by dividing a path quality value by the number of hops. The path quality also depends on the number of hops. Therefore, a parent candidate node with a larger number of hops has less possibility of serving as a good parent candidate node. By using the link quality per hop, the radio communication device 10 is capable of obtaining determination indexes that do not depend on the number of hops.

(B-2) In the above-described embodiment, the example of transmitting response packets to respective nodes in the case where a parent candidate node receives adjacence discovery packets of a plurality of participation nodes has been described. However, the present invention is not limited thereto. For example, it is also possible for the radio communication device 10 (parent candidate node) to transmit one response packet in response to a plurality of adjacence discovery packets. In this case, the parent candidate node stores RSSI values of the received adjacence discovery packets in association with transmission source addresses within a response waiting time, describes all the stored pairs of the RSSI values and the transmission source addresses in a response packet, and broadcasts the response packet. By simply transmitting the one response packet, it is possible for the parent candidate node to reduce its traffic amount. In addition, the way of calculating a response waiting time at a time of receiving a plurality of adjacence discovery packets is not limited. Various kinds of ways can be applied such as a way of selecting a response waiting time of an adjacence discovery packet that has been received first, or a way of selecting a shortest time from calculated response waiting times.

(B-3) In the above-described embodiment, the example of determining whether a parent candidate node is good or not by using a constant threshold has been described. However, the present invention is not limited thereto. For example, it is also possible to determine whether a parent candidate node is good or not by using a threshold that dynamically varies in accordance with the number of adjacent nodes. For example, a larger number of adjacent nodes results in higher density of nodes in a network, and therefore it is assumed that there may be a large number of good parent candidate nodes. In this case, it is possible to avoid collision of response packets by setting a stricter threshold. This enables a participation node to select a good parent node.

(B-4) In the above-described embodiment, the example of operations of the radio communication device 20 at the time of participating in a network has been described. However, the present invention is not limited thereto. For example, it is also possible to establish a relay path for relaying packets from the radio communication device 10 to the management device 20 in a multi-hop manner, by using the system (technical idea) according to the above-described embodiment.

Figure 9:
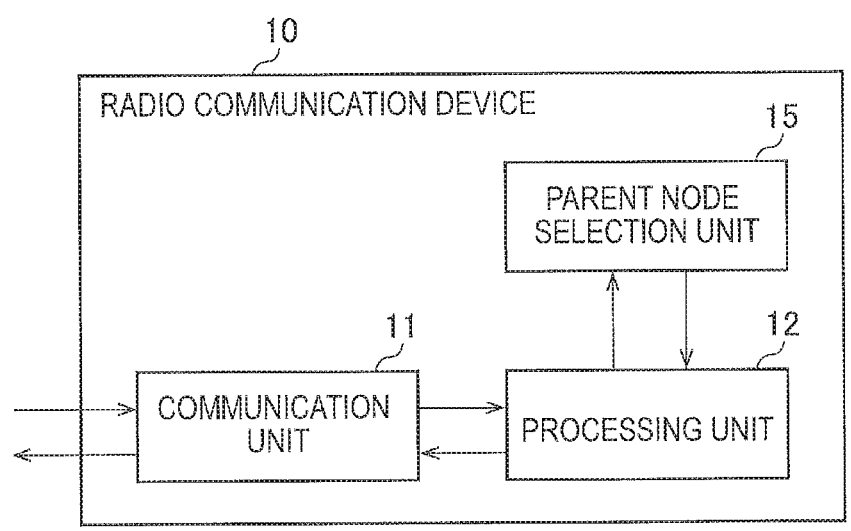
FIG. 9 is a block diagram (part 2) illustrating a functional configuration of a radio communication device according to a modification.

(B-5) In the above-described embodiment, it is assumed that the radio communication system 1 includes the one management device 10. However, the present invention is not limited thereto. For example, the radio communication system 1 may be a radio network system in which the management device 20 is not installed but one or a plurality of predetermined radio communication devices 10 accept connection with the other radio communication devices 10. In this case, the radio communication device 10 (parent candidate node) that accepts the connection may be configured such that the processing unit 12 and the parent node selection unit 15 are eliminated, for example (the configuration illustrated in FIG. 8). The response waiting time calculation unit 14 illustrated in FIG. 8 also functions as the processing unit 12 illustrated in FIG. 1. In addition, the radio communication device 10 (participation node) that requests the connection may be configured such that the response waiting time calculation unit 14 and the adjacent node information management unit 13 are eliminated from the configuration illustrated in FIG. 1 (configuration illustrated in FIG. 9).

Heretofore, preferred embodiments of the present invention have been described in detail with reference to the appended drawings, but the present invention is not limited thereto. It should be understood that they will naturally come under the technical scope of the present invention.

What is claimed is:

1. A radio communication system comprising:
   a radio communication device configured to request connection to a network; and
   a plurality of radio relay devices configured to relay the connection request to the network,
   wherein the radio communication device includes
      an adjacent node discovery unit configured to transmit, to the surrounding network, an adjacence discovery packet for discovering a radio relay device serving as a connection destination among the plurality of radio relay devices, and
      a connection destination selection unit configured to receive one or more response packets from one or more radio relay devices in response to the adjacence discovery packet, and then select the radio relay device serving as the connection destination from among the one or more radio relay device on the basis of index values related to communication qualities used for determining whether to select, as the communication destination, the radio relay devices that are transmission sources of the response packets, and
   wherein the radio relay device includes
      an adjacent node information management unit configured to manage the index value of a radio relay device adjacent to the radio relay device;
      a response waiting time calculation unit configured to receive the adjacence discovery packet from the radio communication device, and then calculate a response waiting time to transmission of the response packet by comparing the index value of the radio relay device and the index value of the adjacent radio relay device with a threshold, and
      a response packet transmission unit configured to transmit the response packet to the radio communication device after elapse of the response waiting time calculated by the response waiting time calculation unit.

2. The radio communication system according to claim 1, wherein the response waiting time calculation unit
   compares the index value of the radio relay device with the threshold,
   selects a first response waiting time that is a range of shorter response waiting time or a second response waiting time that is a range of longer response waiting time from among time periods obtained by dividing a maximum time period that is possibly serve as the response waiting time into two in response to a result of the comparison, and
   calculates the response waiting time within the first response waiting time or the second response waiting time that has been selected, and
wherein the response waiting time calculation unit
   compares the index values of the radio relay device and the adjacent radio relay devices with the threshold,
   counts the number of radio relay devices having good communication qualities and index values that are more than or equal to the threshold,
   lengthens the first response waiting time and shortens the second response waiting time by the lengthened amount when there are a larger number of the radio relay devices having good communication qualities, and
   shortens the first response waiting time and lengthens the second response waiting time by the shortened amount when there are a smaller number of the radio relay devices having good communication qualities.

3. The radio communication system according to claim 2, wherein the first response waiting time is determined within a range with a predetermined success rate in transmission of the response packet from the radio relay device without collision with the response packets transmitted at least from the other radio relay devices.

4. The radio communication system according to claim 2, wherein the response waiting time calculation unit calculates a response waiting time by selecting a slot of the first response waiting time and the second response waiting time that are divided into slot units.

5. The radio communication system according to claim 2, wherein the threshold varies in accordance with the number of adjacent radio relay devices.

6. The radio communication system according to claim 2, wherein, in the case where the adjacence discovery packets are received from one or more other radio communication devices until the calculated response waiting time elapses, the one response packet is transmitted toward the network in response to all the adjacence discovery packets that have been received.

7. The radio communication system according to claim 2, wherein, in the case where the index value corresponding to the radio relay device serving as the transmission source of the response packet is more than or equal to the threshold, the connection destination selection unit selects the radio relay device serving as the transmission source of the response packet as the connection destination, and
wherein, in the case where the connection destination is not selected within a predetermined discovery time period, the connection destination selection unit searches for the best value among the index values that are received within the discovery time period and that correspond to the radio relay devices serving as the transmission sources of the response packets, and selects the radio relay device having the best index value as the connection destination.

8. A radio relay device in a radio communication system including a radio communication device configured to request connection to a network, and a plurality of radio relay devices configured to relay the connection request to the network, the radio relay device comprising:
an adjacent node information management unit configured to manage an index value related to a communication quality of a radio relay device adjacent to the radio relay device;
a response waiting time calculation unit configured to receive, from the radio communication device, an adjacence discovery packet for discovering a radio relay device serving as a connection destination among the plurality of the radio relay devices, and then calculates a response waiting time to transmission of a response packet in response to the adjacence discovery packet by comparing the index value of the radio relay device and the index value of the adjacent radio relay device with a threshold; and
a response packet transmission unit configured to transmit the response packet to the radio communication device after elapse of the response waiting time calculated by the response waiting time calculation unit.

9. A non-transitory computer-readable storage medium having a radio relay program stored therein, the radio relay program causing a computer installed in a radio relay device in a radio communication system including a radio communication device configured to request connection to a network and a plurality of radio relay devices configured to relay the connection request to the network, to function as:
an adjacent node information management unit configured to manage an index value related to a communication quality of a radio relay device adjacent to the radio relay device;
a response waiting time calculation unit configured to receive, from the radio communication device, an adjacence discovery packet for discovering a radio relay device serving as a connection destination among the plurality of the radio relay devices, and then calculates a response waiting time to transmission of a response packet in response to the adjacence discovery packet by comparing the index value of the radio relay device and the index value of the adjacent radio relay device with a threshold; and
a response packet transmission unit configured to transmit the response packet to the radio communication device after elapse of the response waiting time calculated by the response waiting time calculation unit.

\* \* \* \* \*